US006217962B1

(12) United States Patent
Werth

(10) Patent No.: US 6,217,962 B1
(45) Date of Patent: *Apr. 17, 2001

(54) MOISTURE-RESISTANT BARRIER MATERIAL BASED ON COPOLYAMIDE PA-6, I/6, T/6, 6 AND/OR PA-6, I/6, T WHICH IS CAPABLE OF BEING PROCESSED BY DRAWING AND/OR THERMOFORMING

(75) Inventor: Michael Werth, Bernay (FR)

(73) Assignee: Atofina, Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,827

(22) Filed: Jan. 20, 1998

(30) Foreign Application Priority Data

Jan. 20, 1997 (FR) .................................................. 97 00523

(51) Int. Cl.$^7$ .............................. B32B 1/08; B32B 27/34; B29C 47/00; C08G 69/26
(52) U.S. Cl. .................. 428/36.9; 428/35.7; 428/36.92; 428/332; 428/474.4; 428/36.6; 428/36.7; 528/339; 138/118; 264/477
(58) Field of Search ................ 428/36.9, 36.91, 428/35.7, 474.4, 474.7, 475.5, 36.92, 332, 36.6, 36.7; 528/339; 138/118, 124, 125, 140; 206/204; 264/464, 477, 514

(56) References Cited

U.S. PATENT DOCUMENTS

| Re. 34,447 | 11/1993 | Poppe et al. | 524/606 |
|---|---|---|---|
| 2,715,620 | * 8/1955 | Carlston et al. | 260/78 |
| 3,383,369 | * 5/1968 | Ridgway | 260/78 |
| 3,926,924 | * 12/1975 | Edgar et al. | 260/78 |
| 4,238,603 | * 12/1980 | Chapman et al. | 528/339 |
| 4,603,166 | 7/1986 | Poppe et al. | 524/606 |
| 4,696,865 | * 9/1987 | Richardson et al. | 428/474.4 |
| 4,721,654 | 1/1988 | Richardson et al. | 428/474.4 |
| 5,106,693 | 4/1992 | Harada et al. | 428/412 |
| 5,480,945 | 1/1996 | Vicik | 525/432 |

FOREIGN PATENT DOCUMENTS

WO 93/01108 * 1/1993 (WO).
93/01108 1/1993 (WO).

OTHER PUBLICATIONS

Encyclopedia of Chemical Technology, Third Edition, Polyamides (General), vol. 18, pp. 328–371.
Kohan, Meovin I., Nylon Plastics Handbook (1995), pp. 374 and 376–377.

* cited by examiner

*Primary Examiner*—Ellis Robinson
*Assistant Examiner*—John J. Figueroa
(74) *Attorney, Agent, or Firm*—Millen White Zelano & Branigan

(57) ABSTRACT

The present invention relates to materials which are barriers to gases and to liquids, which are resistant to water and which are capable of being shaped into single- or multimaterial thin layers or films which can be processed by drawing and/or thermoforming. These barrier materials are based on copolyamide composed essentially of units derived from hexamethylenediamine, iso- and terephthalic acids and optionally adipic acid.

They can be used for the manufacture of composite materials comprising one or more thin layers, sheets and/or films, pipes or hollow bodies intended in particular for the packaging of chemicals, foodstuffs or pharmaceutical and/or cosmetic products.

11 Claims, No Drawings

MOISTURE-RESISTANT BARRIER MATERIAL BASED ON COPOLYAMIDE PA-6, I/6, T/6, 6 AND/OR PA-6, I/6, T WHICH IS CAPABLE OF BEING PROCESSED BY DRAWING AND/OR THERMOFORMING

FIELD OF THE INVENTION

The present invention relates to the field of polymer materials which are barriers to gases and liquids and more particularly of transparent materials which are resistant to water and capable of being shaped into single- or multimaterial thin layers or films.

BACKGROUND OF THE INVENTION

Many barrier materials and in particular amorphous polyamide resins are described in the literature. Thus, the subject of EP 411,601 is multilayer films for petrol tanks in which one layer is composed of amorphous copolyamide 6,I/6,T. However, these amorphous polyamide resins require high processing temperatures, for example during thermoforming of the finished article, and when the finished article containing these amorphous polyamide resins is biaxially orientated, its barrier properties are greatly reduced.

To overcome this disadvantage, provision was then made to combine amorphous polyamide resins with other resins, such as crystalline polyamides.

The subject of EP 287,839 is multilayer films in which one layer comprises a mixture of crystalline polyamide and of amorphous polyamide (PA-6,I/6,T).

EP 366,382 describes a composition for blown or moulded bottles composed of a mixture of PA-6, PA-6,6, of amorphous PA and of a lamellar filler, and WO 93/01108 describes a food container composed of a mixture of PA-6,6, of several amorphous PAs, of a lamellar filler and of an ionomeric resin.

These technical solutions have the disadvantage of requiring an additional stage, namely the mixing of more or less compatible resins, sometimes necessitating the addition of a compatibilizing agent.

Another very widespread barrier material is composed of the family of copolymers of ethylene and of vinyl alcohol (EVOH). However, EVOH, in addition to its high price, has low resistance to moisture, which prevents it from being used in the preparation of single-material articles and, when it is used for composite articles, necessitates the addition of at least one intermediate layer between the EVOH and the wet medium, in order to prevent direct EVOH/wet medium contact. Moreover, when multilayer containers or films are prepared with an EVOH barrier layer according to a solid-phase thermoforming process, it is found that the EVOH cannot be shaped at the relatively low temperatures required for thermoforming the other resins of the multilayer structure without rupturing the EVOH layer, resulting in a loss in the overall barrier properties. In order to limit these disadvantages, it is also possible to combine the EVOH with other resins. Thus, the subject of EP 305,146 is mixtures of EVOH (mainly) and of amorphous polyamides for the manufacture of multilayer containers obtained by thermoforming.

However, none of the abovementioned references provides a material which simultaneously possesses sufficient barrier properties to be used alone and is capable of being employed easily and processed, in particular according to thermoforming, drawing techniques, without a decrease in its barrier properties.

SUMMARY OF THE INVENTION

The invention which is the subject of the present application relates to a barrier material which satisfies these criteria and thus makes it possible to dispense with a mixture of resins in the preparation of a (single-)layer which is a barrier to liquids and to gases. This material additionally exhibits good adhesion to many resins and has good transparency, which is an advantage in the preparation of items intended for packaging, in particular food packaging.

The barrier material according to the invention comprises at least a copolyamide, essentially composed of units derived from hexamethylenediamine, iso- and terephthalic acids and optionally adipic acid, which exhibits a degree of crystallinity ($\chi_c$) of at least 5% and preferably of at least 8%, measured by X-ray diffraction in the wide-angle range using a refractometer of θ-θ type (cf. Nylon Plastics Handbook, M. I. Kohan, Hanser Publishers: 1995, 4.6.2 Crystallinity, p. 98–100).

The barrier material according to the invention contains at least a PA-6,I/6,T copolyamide or a PA-6,I/6,T/6,6 terpolyamide -mentioned below as "polyamide according to the invention"- comprising, per 100 mol of copolyamide:

from 40 to 67 mol of PA-6,I,
from 30 to 45 mol of PA-6,T,
and from 0 to 20 mol of PA-6,6, and preferably from 46 to 62 mol of PA-6,I,
from 30 to 42 mol of PA-6,T,
and from 6 to 12 mol of PA-6,6.

The polyamide according to the invention can additionally contain up to 5% by weight of other polyamide monomers, such as one or more dicarboxylic acids and/or diamines and/or amino acids and/or lactams, among which mention may in particular be made of 1,4-diaminocyclohexane, caprolactam, dodecalactam, octamethylenediamine, decamethylenediamine, dodecamethylenediamine, 1,5-diaminohexane, 2,2,4-trimethyl-1, 6-diaminohexane, piperazine, 3,3'-dimethyl-4, 4'-diaminodicyclohexylmethane, 4,4'-diaminodicyclohexylmethane, 2,2'-bis(4-aminocyclohexyl) propane, isophoronediamine, or azelaic, sebacic and dodecanedioic acid.

Its level of di(6-aminohexyl)amine, a triamine resulting from the possible dimerization of hexamethylenediamine, measured by proton NMR, is preferably less than 1.5 molar %.

The intrinsic viscosity of the copolyamides according to the invention, measured at 25° C. in a 0.5 g/dl solution of polymer in meta-cresol, is between 0.75 and 1.3, preferably between 0.85 and 1.05.

The polyamide according to the invention can be polymerized according to a process similar to that employed in the continuous or batchwise synthesis of PA-6, 6.

The monomers (hexamethylenediamine, iso- and terephthalic acids and optionally adipic acid) are charged to a reactor, preferably in the form of an aqueous saline solution generally containing from 20 to 40% by weight of water, at least one of the monomers being introduced into the reaction mixture in slight excess with respect to the proportion targeted in the final copolymer. The reaction mixture is then heated to a temperature of between 200 and 240° C., and preferably in the region of 220° C., under autogenous pressure. The pressure within the reactor generally reaches 1.5 to 2.5 MPa and the temperature is maintained, while stirring the reaction mixture, for approximately thirty minutes.

The water present in the reaction mixture is then evaporated off while suppressing the appearance of surface foam and while avoiding an excessively sudden drop in the pressure. The duration of this operation is generally between 1 hour 30 and 3 hours 30, preferably in the region of 2 hours, the temperature preferably being maintained at 240° C. When the reactor has returned to atmospheric pressure, the polymerization is continued, either under reduced pressure or under a stream of nitrogen, for a period of time generally of between about twenty minutes and 1 hour 30. The polymer is recovered, for example, in the form of extruded granules at a temperature of between 250 and 300° C.

It has been found that the degree of crystallinity of the polyamide according to the invention depends on its thermal history. Thus, the degree of crystallinity of the polyamide as polymerized and extruded will increase when the said polyamide is subsequently heated at a temperature between its glass transition temperature and its maximum melting temperature. Likewise, shearing and/or drawing carried out in this temperature range have the effect of increasing the degree of crystallinity of the polyamide according to the invention and its barrier properties.

The Applicant Company has also noted that some products, in particular water, when they are in contact with the polyamide according to the invention, lower its glass transition temperature; it will be important, during any heat treatment, to take this phenomenon into account.

Besides the copolyamide or the terpolyamide described above, the barrier material according to the invention may contain various additives and/or modifiers, among which may be mentioned:
  dyes and pigments, such as titanium dioxide, carbon black, cobalt oxide, iron oxides, nickel titanate or organic pigments, such as phthalocyanine and anthraquinone derivatives,
  brightening agents, such as thiophene derivatives,
  antioxidants, such as copper iodide combined with potassium iodide, or hindered amine or phenol derivatives,
  UV stabilizers, such as resorcinol derivatives, benzotriazoles or salicylates,
  chain-limiting agents, such as monocarboxylic acids or monoamines,
  reinforcing fillers, such as wollastonite, glass beads, talc, mica, glass fibre, carbon fibre, boron nitride fibre, calcium carbonate and/or magnesium carbonate.

Another subject of the present invention is the use of the barrier material described above in the preparation of composite materials preferably comprising one or more thin layers, sheets and/or films, pipes or hollow bodies.

These materials can be employed according to the techniques conventionally employed for thermoplastic resins.

Mention will very particularly be made, as examples of multilayer materials, of those combining:
  a) at least one layer based on the barrier material according to the invention,
  b) at least one layer based on polyolefin and/or on polyester and/or on acrylic polymer and/or on polycarbonate,
  c) and at least one layer of adhesive binder between the layers a) and b), for example based on polyolefin grafted or copolymerized with reactive polar molecules,
  and optionally one or more other layers, such as:
    d) at least one layer based on other barrier materials, for example based on EVOH,
    e) at least one layer based on amorphous polyamide and/or on semicrystalline polyamide, such as PA-6, it being possible for the layer comprising the barrier material according to the invention to be positioned at the surface or sandwiched between other layers.

The barrier material according to the invention can be used in the manufacture of hollow bodies which can be obtained either according to an extrusion blow-moulding technique or by biaxial orientation of preforms prepared by injection. These hollow bodies can be flasks or bottles intended for the packaging of chemicals, foodstuffs or pharmaceutical and/or cosmetic products.

The hollow bodies prepared by extrusion blow-moulding, besides a layer based on the barrier material according to the invention, advantageously comprise a layer based on polyolefin, for example PE or PP, and optionally an EVOH layer, the contact between the different layers preferably being provided by a coextrusion binder. Mention may be made, as examples of multilayer structures, of the following combinations:
  hdPE/binder/EVOH/binder/barrier material according to the invention,
  PE/binder/barrier material according to the invention/binder/PE,
  hdPE/binder/barrier material according to the invention
  where the barrier material according to the invention, if it is at the surface of the structure, is preferably in contact with the contents of the hollow body.

When a preform injection technology is employed, it is possible to biaxially orientate the preforms by heating them to a temperature in the region of (but greater than) the glass transition of the material of which they are composed, in this instance the barrier material according to the invention, and by then drawing them along their main axis and, using a mandrel, perpendicularly to the said axis. This technique has the advantage of improving the barrier properties of the material according to the invention.

It is also possible to inject multilayer preforms by coinjection, so as to obtain preforms of core-skin type. Mention will very particularly be made, among multilayer preforms, of those which comprise a thin core made of barrier material according to the invention and a thicker skin made of poly (ethylene terephthalate) (PET). It is possible to produce even more complex multilayer preforms typically composed of 4 or 5 layers according to the teaching of U.S. Pat. No. 5,143,733. Mention may be made, as an example of 5-layer structures, of the combination PET/material according to the invention/PET/material according to the invention/PET.

The barrier material is also suitable for conversion into single- and multilayer films according to tube or flat-die extrusion techniques, with possible chilling on a chill roll, which is particularly preferred in order to obtain completely transparent films.

It is possible, in the preparation of multilayer films, to combine the material according to the invention with polyolefins and/or with EVOH and/or with other barrier materials, such as those described above. These single- and multilayer films can be biaxially orientated (which has the effect of improving their barrier properties). The biaxial orientation can be carried out on a flat sheet or as a double bubble tube.

The barrier materials can also be shaped into single- and multilayer pipes by extrusion, for example through an annular die, followed by vacuum sizing; mention will very particularly be made, as examples of multilayer pipes, of those comprising, besides a layer of material according to the invention, at least one layer based on polyolefin, preferably based on PE, the adhesion between the polyolefin and the material according to the invention being ensured by means of a binder, according to the combinations:

PE/binder/material according to the invention,

PE/binder/material according to the invention/binder/PE.

Such pipes are particularly suited to the transportation of hydrocarbons.

The barrier material according to the invention can also be used as a mixture with other resins, in particular with other PA resins, among which may be mentioned aliphatic PAs, such as PA-6 and/or PA-6,6, amorphous PAs, PAs of the phtalamide type, and the like. In the case of mixtures of the barrier material accordint to the invention with PA-6 and/or PA-6,6, when the aliphatic PA(s) is(are) the major component(s), the presence of the barrier material very substantially improves the ability of the aliphatic PA or PAs to be biaxially orientated, decreases its moisture uptake and improves its ability to be processed, for instance by extrusion, (processing-aid) as well as its transparency.

In the case of mixtures of the barrier material with PA-6 and/or PA-6,6 in which the barrier material is the major component, the presence of aliphatic PA or PAs improves the ability of single-layer films made of barrier material to be biaxially orientated and modifies their stiffness.

Examples 1 to 7

Synthesis of Polyamide According to the Invention

Example 1

The monomers (hexamethylenediamine, iso- and terephthalic acids and adipic acid) are charged in the form of an aqueous saline solution to a 980 l autoclave made of stainless steel equipped with an anchor stirrer, the adipic acid being introduced into the reaction mixture in a slight excess with respect to the proportion targeted in the final copolymer. The proportions of the ingredients are as follows:

| | |
|---|---|
| hexamethylenediamine | 133.0 kg |
| adipic acid | 16.8 kg |
| isophthalic acid | 87.0 kg |
| terephthalic acid | 58.0 kg |
| demineralized water | 80 kg |

The reaction mixture is purged 5 times with nitrogen, the pressure in the reactor being alternated between atmospheric pressure and 800 kPa, and then heated to 220° C. under autogenous pressure. The pressure within the reactor reaches 2.3 MPa and the temperature is maintained while stirring the reaction mixture for 30 min, the rate of stirring being of the order of 40 rev/min.

The water present in the reaction mixture is then slowly evaporated, the appearance of surface foam being supressed and an excessively sudden drop in the pressure being avoided. The duration of this operation is 2 h 30, the temperature being slightly increased to 240° C. The contents of the reactor are then brought back to atmospheric pressure and polymerization is continued by heating the reaction mixture at 270° C. under a stream of nitrogen for approximately 1 h and by decreasing the stirring to 15 rev/min.

The molten polymer thus obtained is then extruded via the bottom valve of the reactor, a slight nitrogen positive pressure being established within the reactor, and the temperature is 270° C.

The polymer is then dried for 6 h at 60° C. and then 6 h at 80° C. Its molar composition is as follows:

| | |
|---|---|
| PA-6, I | 0.54 |
| PA-6, T | 9.36 |
| PA-6, 6 | 0.115 |

Its intrinsic viscosity is in the range from 0.85 to 1.05 g/dl. A film with a thickness of 50 mm extruded through a flat die using the above polymer has a degree of crystallinity $\chi_c$ of 9%.

Examples 2 to 7

Terpolyamides are prepared according to the procedure of Example 1 which have different molar compositions shown in Table 1 and in which the level of di(6-aminohexyl)amine, measured by proton NMR, is always less than 1.5%.

The glass transition temperature Tg, the melting peak Tm and the melting range of the different resins are determined by differential scanning calorimetry (DSC). The results are combined in Table 1.

TABLE 1

| Example | PA-6, I/6, T/6,6 6 Molar composition | Tg ° C. | Tm peak ° C. | Melting range ° C. |
|---|---|---|---|---|
| 2 | 0.54/0.40/0.06 | 122 | 236 | 200–277 |
| 3 | 0.57/0.40/0.03 | 126 | 242 | 215–280 |
| 4 | 0.58/0.36/0.06 | 121 | 249 | 219–262 |
| 5 | 0.52/0.38/0.06 | 116 | 246 | 201–276 |
| 6 | 0.54/0.34/0.12 | 115 | 240 | 200–250 |
| 7 | 0.534/0.356/0.117 | 117 | 234 | 195–275 |

Examples 8 to 14

Use of Polyamides According to the Invention as Barrier Materials

Examples 8 to 10 Single-Layer Films

The resin of Example 1 was extruded in the form of a single-material cast thin sheet with a thickness of between 20 and 60 $\mu$m (Example 8). The film obtained is completely transparent and glossy, without visual defects due to gels and/or unmolten materials.

A portion of the above film is annealed (Example 9), i.e. stored for 12 h at 80° C. in a closed chamber with a relative humidity of 100%. The degree of crystallinity of the annealed film $\chi_c$ is 14%.

By way of comparison, a film of the same thickness is extruded which is composed of an amorphous polyamide PA-6,I/6,T (i.e., not exhibiting an endothermic crystalline melting peak by DSC, the measurement being carried out according to ASTM Standard D 3417 and $\chi_c$=0%), the molar ratio of the units derived from isophthalic acid to the units derived from terephthalic acid being 70/30 (Example 10). This resin is sold by Du Pont de Nemours under the name Selar® PA.

The permeability to oxygen (pO$_2$) and the permeability to oxygenated or non-oxygenated petrol of the 3 films described above are measured, using an Oxtran device, in a chamber with a relative humidity (RH) of zero and then in a chamber with a relative humidity of 75%. The permeability to oxygen results, expressed in cm$^3$* 20 $\mu$m/m$^2$*24 h*atm, and the permeability to petrol results, expressed in g*20 $\mu$m/m$_2$* 24 h*atm, are combined in Table 2.

TABLE 2

| Example | Molar composition as PA-6, I/6, T/6, 6 | pO$_2$ at 0% RH | pO$_2$ at 75% RH | Petrol C | Petrol TF1 |
|---|---|---|---|---|---|
| 8 | 0.54/0.36/0.11 | 60 | 26 | 2 | 35 |
| 9 | 0.54/0.36/0.11 | 49 | 7–8 | 2 | 40 |
| 10 | 0.70/0.30/0.00 | 50 | 25 | 5 | 48 |

Petrol C: mixture of equal volumes of toluene and isooctane

Petrol TFl: mixture containing 10% by volume of ethanol and 90% of petrol C

Examples 11 to 14

Multilayer Films

With the use of a Bekum® extrusion blow-moulding machine, three-layer and five-layer films are extruded in which one of the layers is composed of the resin of Example 1, of Selar® PA or of EVOH containing 29 mol % of ethylene and with a degree of saponification of greater than 99%, the adjacent layer or layers being a binder based on ethylene copolymer grafted maleic anhydride sold by the Applicant Company under the name Orevac® 18032, the layer being itself optionally in contact with an hdPE layer with a melt flow index, measured at 1 g 0° C. under a load of 2.16 kg according to ISO Standard 1133, of 0.3 and with a relative density, measured according to ISO Standard 1133, of 0.953. The structures and thicknesses of the films are shown in Table 3. Their permeability to oxygen is measured in a chamber maintained at 100% relative humidity. The results are combined in Table 3.

TABLE 3

| Example | Structure & thickness ($\mu$m) of the film | pO$_2$ at 100% RH |
|---|---|---|
| 11 | hdPE/binder/Selar PA 356/44/64 | 0.096 |
| 12 | hdPE/binder/PA, Example 1 318/76/44 | 0.065 |
| 13 | hdPE/binder/PA, Example 1 406/64/51 | 0.057 |
| 14 | hdPE/binder/EVOH/binder/hdPE 305/25/44/25/102 | 0.101 |

The preceding examples can be repeated with similar success by substituting the generically or specifically described reactants and/or operating conditions of this invention for those used in the preceding examples.

With respect to the various PA, I and T abbreviations, they are well known in the literature and, it is believed that they were developed and are still used by the British Standards Institute, for polyamides, instead of using "nylon" abbreviations.

The entire disclosure of all applications, patents and publications, cited above and below, and of corresponding French application No. 97/00523, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A Terpolyamide, comprising per 100 mol of monomers
   from 42 to 62 mol of PA-6,I
   from 30 to 42 mol of PA-6,T,
   and from 3 to 12 mol of PA-6,6,
   and in that it exhibits a degree of crystallinity ($\chi_c$) of at least 5% measured by X-ray diffraction in the wide-angle range wherein said terpolyamide is tractable in standard blow moulding or thermoforming machines.

2. A terpolyamide according to claim 1, comprising per 100 mol of monomers:
   from 46 to 62 mol of PA-6,I,
   from 30 to 42 mol of PA-6,T,
   and from 6 to 12 mol of PA-6,6.

3. A barrier material in a form which is a barrier to gases and to liquids and which is resistant to moisture, said barrier material comprising a terpolyamide according to claim 1.

4. A single-layer article, in the form of a sheet, film, pipe or hollow body, comprising the barrier material of claim 3.

5. A composite article in the form of a sheet, film, pipe or hollow body, comprising at least one barrier material as defined in claim 3.

6. A process for the manufacture of a article a single layer article as defined in claim 4, wherein at least one stage of the process includes a heating step carried out at a temperature between the glass transition temperature of the terpolyamide and its maximum melting temperature increasing the degree of crystallinity.

7. In a package of chemicals, foodstuffs or pharmaceutical and/or cosmetic products, the improvement wherein the package comprises packaging material comprising a barrier material according to claim 3.

8. A trypolyamide according to claim 1, wherein said degree of crystallinity is at least 8%.

9. A polyamide according to claim 1, having a melting range of 195–280° C.

10. A polyamide according to claim 1, having an intrinsic viscosity of 0.85 to 1.05 g/dl.

11. An annealed film comprising the polyamide of claim 1, and having a degree of crystallinity of at least 14%.

* * * * *